United States Patent
D'Evelyn et al.

(10) Patent No.: US 6,398,867 B1
(45) Date of Patent: Jun. 4, 2002

(54) CRYSTALLINE GALLIUM NITRIDE AND METHOD FOR FORMING CRYSTALLINE GALLIUM NITRIDE

(75) Inventors: Mark Philip D'Evelyn, Niskayuna; Kristi Jean Narang, Rensselaer, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/413,446

(22) Filed: Oct. 6, 1999

(51) Int. Cl.[7] .............................................. C30B 11/10
(52) U.S. Cl. .............................. 117/11; 117/68; 117/71; 117/73; 117/952
(58) Field of Search .............................. 117/11, 68, 71, 117/73, 78, 952, 217, 202

(56) References Cited

U.S. PATENT DOCUMENTS

| | | | |
|---|---|---|---|
| 3,959,453 A | * 5/1976 | Torikai et al. | 423/619 |
| 4,832,922 A | * 5/1989 | Nishizawa | 117/202 |
| 5,306,662 A | 4/1994 | Nakamura et al. | 438/509 |
| 5,433,169 A | 7/1995 | Nakamura | 117/102 |
| 5,637,531 A | 6/1997 | Porowski et al. | 117/89 |

FOREIGN PATENT DOCUMENTS

| | | |
|---|---|---|
| FR | 2 724 645 | 3/1996 |
| FR | 2 796 657 | 1/2001 |
| JP | 58-161995 | * 9/1983 |
| WO | WO 95/04845 | 2/1995 |
| WO | WO 97/13891 | 4/1997 |

OTHER PUBLICATIONS

Dwilinski, R. et al., "GaN synthesis by ammopnothermal method" Acta Physica Polonica A vol. 88: 833–836, 1995.*
Treaties on Solid–State Chemistry, edited by NB Hanney, vol. 5, "New Phases at High Pressure", JC Joubert and J. Chenavas, pp. 463–511 (NY: Plenum, 1975).
Current Topics in Materials Science, vol. 8, edited by E. Kaldis, North–Holland Publishing Company, 1982, High–Pressure Ammonolysis in Solid–State Chemistry, H. Jacobs and D. Schmidt, pp. 381–427.

(List continued on next page.)

Primary Examiner—Benjamin L. Utech
Assistant Examiner—Duy-Vu Deo
(74) Attorney, Agent, or Firm—Robert P. Santandrea; Noreen C. Johnson (57) ABSTRACT

A gallium nitride growth process forms crystalline gallium nitride. The process comprises the steps of providing a source gallium nitride; providing mineralizer; providing solvent; providing a capsule; disposing the source gallium nitride, mineralizer and solvent in the capsule; sealing the capsule; disposing the capsule in a pressure cell; and subjecting the pressure cell to high pressure and high temperature (HPHT) conditions for a length of time sufficient to dissolve the source gallium nitride and precipitate the source gallium nitride into at least one gallium nitride crystal. The invention also provides for gallium nitride crystals formed by the processes of the invention.

36 Claims, 6 Drawing Sheets

OTHER PUBLICATIONS

Mat. Res. Soc. Symp. Proc. vol. 495, 1998, Materials Research Society, "Materials Chemistry and Bulk Crystal Growth of Group III Nitrides in Supercritical Ammonia", Joseph W. Kolis, et al, pp. 367–372.

MRS Internet Journal of Nitride Semiconductor Research, vol. 3, Article 25, "Ammono method of BN, AlN and GaN synthesis and crystal growth", R. Dwilinski, et al, (Sep. 1998), pp. 1–6.

MRS Internet Journal of Nitride Semiconductor Research, vol. 4S1, G1.3 (1999), "Near Defect Free GaN Substrates", S. Porowski. Presented at a Nesting of the Materials Research Soc., in Boston MA, Nov. 30–Dec. 4, 1998.

Elsevier, Diamond and Related Materials, (1998), "Ammono method of GaN and AlN production", R. Dwilinski, et al, pp. 1348–1350.

XXV International School of Semiconducting Compounds, Jaszowiec, (1996), vol. 90, Acta Physica Polonica A, "On GaN Crystallization by Ammonothermal Method", R. Dwilinski, et al, pp. 763–766.

Elsevier, Materials Science & Engineering B, (1997), "Growth and properties of single crystalline GaN substrates and homoepitaxial layers", S. Porowski, pp. 407–413.

Elsevier, Journal of Crystal Growth 66 (1984), North–Holland, Amsterdam, "Equilibrium Pressure on $N_2$ Over GaN and High Pressure Solution Growth of GaN", J. Karpinski, et al, pp. 1–10.

* cited by examiner fig. 1 fig. 2 fig. 3 fig. 4 fig. 5 fig. 6 fig. 7

CRYSTALLINE GALLIUM NITRIDE AND METHOD FOR FORMING CRYSTALLINE GALLIUM NITRIDE

BACKGROUND OF THE INVENTION

The invention relates to methods for forming crystalline gallium nitride. In particular, the invention relates to methods for high temperature growth of crystalline gallium nitride in a supercritical solvent.

Crystalline gallium nitride is useful as a material for applications in electronic devices including, but not limited to, light-emitting diodes and laser diodes. Currently, gallium nitride (GaN) crystal size and growth, which are produced by known processes, are adequate for some applications, however for many other applications, the gallium nitride crystalline size and quality are not adequate.

Several processes are currently used to produce gallium nitride crystalline substrates. The processes include heteroepitaxial growth of gallium nitride on a substrate, such as a sapphire or silicon carbide. The heteroepitaxial growth process often results in defects, which include, but are not limited to, high concentrations of at least one of dislocations, vacancies, and impurities. These defects may have undesirable and detrimental effects on epitaxially grown gallium nitride, and may adversely influence operation of the resultant gallium nitride-based electronic device. These adverse influences include compromised electronic performance and operation. Presently, heteroepitaxial gallium nitride growth processes require complex and tedious steps to reduce defect concentrations in the gallium nitride.

Known gallium nitride growth processes do not provide large gallium nitride crystals, for example gallium nitride crystals greater than about 0.8 inches (about 2 centimeters) in diameter or greater than about 0.01 inches (about 250 microns) in thickness. Further, the known methods are not known to provide for production of large gallium nitride crystals that result in single-crystal gallium nitride boules, for example gallium nitride crystals of about 1 inch in diameter and about 0.5 inches in thickness, which are suitable for forming wafers. Thus, applications for gallium nitride are limited due to size constraints.

Also, most known gallium nitride crystal production processes do not provide high-quality gallium nitride crystals that possess low concentrations of impurities and dislocations with adequate size and growth rates for electronic device applications. Further, the known gallium nitride crystal production processes are not believed to provide an economical process with nitride growth rates that enable moderate-cost gallium nitride crystal production. Therefore, applications for gallium nitride are further limited due to quality and cost-of-production factors.

Small gallium nitride crystals, such as platelets and needles, have been grown by reaction of nitrogen ($N_2$) gas with gallium (Ga) metal at pressures in a range from about 10 to about 20 kbar and at temperatures in a range of about 1200° C. to about 1500° C. The gallium nitride crystalline quality produced by this process may be adequate, in terms of dislocation density, for some gallium nitride applications. The gallium nitride crystalline quality formed by this process, however, exhibits a high concentration of undesirable nitrogen-vacancy defects, which adversely influences certain gallium nitride crystal applications. Additionally, this process appears to be limited to producing a maximum gallium nitride crystal size of about 15 millimeters (mm) to about 20 mm in diameter and only about 0.2 mm in thickness. This gallium nitride production process may also suffer from small gallium nitride crystal growth rates, for example growth rates of about 0.1 mm/hr.

Small gallium nitride crystals, for example in the form of crystalline platelets and/or needles with a size less than about 0.4 millimeters (mm), have been grown in supercritical ammonia ($NH_3$) in pressure vessels. These supercritical ammonia growth processes exhibit slow growth rates, and thus do not enable boules or large gallium nitride crystals to be readily produced. Also, the pressure vessels limit these gallium nitride growth processes. The pressure vessels limit the supercritical ammonia growth process to a pressure less than about 5 kbar, and thus limit the supercritical ammonia growth process temperature and reaction rate.

Gallium nitride growth on an existing substrate has been proposed by a chemical vapor deposition (CVD) process. The CVD process may use reactions, such as, but not limited to, $GaCl+NH_3$ or $Ga(CH_3)_3+NH_3$. These CVD processes are believed to be limited by at least one of: limited capability for growing large, thick gallium nitride crystals and substrates; poor gallium nitride crystal quality due in part to the use of an existing substrate, such as sapphire and silicon carbide, that may result in an undesirable lattice mismatch; and subsequent low gallium nitride crystal growth rates. These CVD process limits may lead to high costs of gallium nitride growth, which, of course, is undesirable.

Further, gallium nitride growth from other processes, such as reacting of gallium and $NaN_3$ at elevated pressures, atmospheric-pressure flux growth, and metathesis reactions ($GaI_3+Li_3N$) have been proposed. These proposed growth processes are believed to be costly, and are not believed to produce high-quality, defect free gallium nitride in crystalline form.

Therefore, a gallium nitride crystal growth process that produces gallium nitride crystals of high quality is needed. Further, a gallium nitride crystal growth process that can produce large gallium nitride crystals is needed.

SUMMARY OF THE INVENTION

A gallium nitride growth process forms crystalline gallium nitride. The process comprises the steps of providing a source gallium nitride; providing mineralizer; providing solvent; providing a capsule; disposing the source gallium nitride, mineralizer and solvent in the capsule; sealing the capsule; disposing the capsule in a pressure cell; and subjecting the pressure cell to high pressure and high temperature (HPHT) conditions for a length of time sufficient to dissolve the source gallium nitride and precipitate it into at least one gallium nitride crystal.

Another gallium nitride growth process for forming crystalline gallium comprises providing of providing a source gallium nitride; providing mineralizer; providing solvent; providing a capsule; disposing the source gallium nitride, mineralizer and solvent in the capsule; sealing the capsule; disposing the capsule in a pressure cell; and subjecting the pressure cell to high pressure and high temperature (HPHT) conditions for a length of time sufficient to dissolve the source gallium nitride and precipitate it into at least one gallium nitride crystal; cooling the high pressure and high temperature (HPHT) system; relieving the pressure in the high pressure and high temperature (HPHT); removing the gallium nitride crystals from the high pressure and high temperature (HPHT) system; and washing the gallium nitride crystals in at least one of water and mineral acids.

A further gallium nitride growth process for forming crystalline gallium nitride comprises providing a capsule that comprises two opposed end units; disposing a seed gallium nitride crystal in one end unit of the capsule; disposing source gallium nitride with mineralizer and solvent in the other end unit of a capsule; disposing solvent in each of the capsule end units; sealing the capsule; disposing the capsule in a pressure cell; and subjecting the pressure cell to high pressure and high temperature (HPHT) conditions in a high pressure and high temperature (HPHT) system for a length of time sufficient to dissolve the source gallium nitride and precipitate it into at least one gallium nitride crystal.

A still further gallium nitride growth process for forming crystalline gallium nitride comprises providing solid or liquefied gallium as the source gallium material; providing a capsule that comprises two opposed end units; disposing a seed gallium nitride crystal in one end unit of the capsule; disposing the source gallium with mineralizer and solvent in the other end unit of the capsule; disposing solvent in each of the capsule end units; sealing the capsule; disposing the capsule in a pressure cell; subjecting the pressure cell to high pressure and high temperature (HPHT) conditions for a length of time sufficient to react the source gallium with the nitrogen-containing solvent under the HPHT growth conditions to form gallium nitride; and subjecting the capsule to high pressure and high temperature (HPHT) conditions for a length of time sufficient to dissolve the formed gallium nitride and precipitate it into at least one gallium nitride crystal.

The invention also provides for gallium nitride crystals formed by each of above the above-described processes.

These and other aspects, advantages and salient features of the invention will become apparent from the following detailed description, which, when taken in conjunction with the annexed drawings, where like parts are designated by like reference characters throughout the drawings, disclose embodiments of the invention.

DESCRIPTION OF THE INVENTION

Crystallized gallium nitride (GaN) grown by gallium nitride growth processes includes the steps of crystallization (precipitation) of source or starter gallium nitride (hereinafter "source" gallium nitride) into crystalline gallium nitride. The gallium nitride growth process, as embodied by the invention, is conducted at high (elevated) pressure and high (elevated) temperature (as described below) in a supercritical fluid solvent, such as a nitrogen-containing solvent, for example at least one of ammonia, hydrazine, or an organic solvent, such as but not limited to, methylamine or ethylenediamine. The term supercritical fluid means a dense gas that is maintained above its critical temperature, which is a temperature above which the gas cannot be liquefied by pressure. Supercritical fluids are generally less viscous and diffuse more readily than liquids, however possess a similar solvative ability of liquids. A nitrogen-containing organic solvent that is a solid at room temperature, such as melamine, may also provide a suitable supercritical solvent under reaction constitutions. The terms poorly crystallized gallium nitride and well-crystallized gallium nitride define degree of crystallinity in the source gallium nitride. For example, poorly crystallized gallium nitride lacks recognizable facets and is characterized by broad x-ray diffraction peaks and an absence of detectable higher order diffraction peaks with d-spacings in a range from about 1.0 Angstroms to about 1.6 Angstroms.

The gallium nitride growth process, as embodied by the invention, produces a high-quality gallium nitride, which is essentially defect-free gallium nitride so the gallium nitride defects do not adversely influence its use in various applications. The gallium nitride growth process, as embodied by the invention, will now be discussed with reference to FIGS. 1–4 that are flowcharts of gallium nitride growth processes and steps, within the scope of the invention. The illustrated gallium nitride growth processes and steps are merely exemplary and are not intended to limit the invention.

Figure 1:
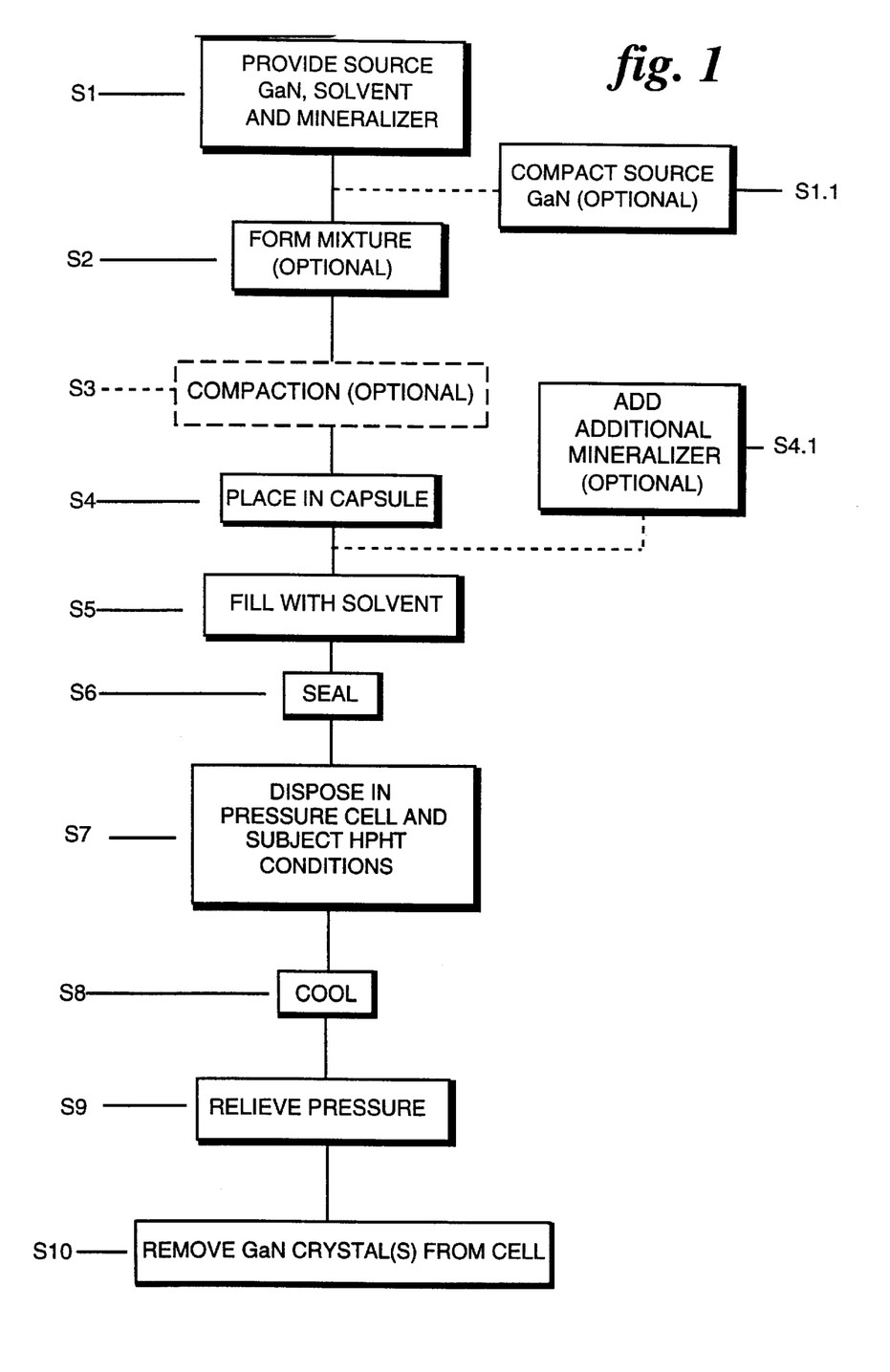
FIG. 1 is a flowchart illustrating a gallium nitride growth process, as embodied by the invention.

A gallium nitride growth process, as illustrated in FIG. 1, comprises providing a source gallium nitride, solvent, and mineralizer, in step S1. The source gallium nitride may comprise at least one of poorly-crystallized gallium nitride, well-crystallized gallium nitride, amorphous gallium nitride, polycrystalline gallium nitride, and combinations thereof. The source gallium nitride may be provided "as-is" in its raw form. Alternatively, the source gallium nitride can be compacted into a "pill" in step S1.1.

The source gallium nitride may then be combined with at least one of the mineralizer and solvent to form a mixture in step S2. Step S2 is optional, and the gallium nitride, solvent, and mineralizer can be provided individually to the capsule as separate and distinct un-combined materials in step S4. The mixture, which can comprise gallium nitride and at least one of the solvent and mineralizer, can be optionally compacted into a pill in step S3, however the compacting of the mixture in step S3 need not be conducted in the gallium nitride growth process, as embodied by the invention.

The source gallium nitride, solvent, and mineralizer, whether as a mixture that is compacted or not compacted, are then placed inside a capsule in step S4. Optionally, additional mineralizer can be added to the capsule in step S4.1. The capsule, which will be described hereinafter, can then be filled with a nitrogen-containing solvent, for example at least one of ammonia or hydrazine, or an organic solvent, including, but not limited to, methylamine, melamine, or ethylenediamine, in step S5. The capsule is then sealed in step S6, disposed in a pressure cell, and subjected to high pressure and high temperature (HPHT) conditions in an appropriate HPHT system, in step S7. The HPHT conditions are maintained for a length of time sufficient to dissolve the source gallium nitride and precipitate it onto at least one gallium nitride crystal, gallium nitride boule, or gallium nitride crystal seed. Maintaining HPHT conditions yields large single gallium nitride crystals, for example single gallium nitride crystals having a diameter and thickness in a range from about 0.02 inch (about 0.05 cm) to about 12 inches (about 30 cm), for example a size in a range from about 2 inches to about 6 inches. The pressure during step S7, as embodied by the invention, is in a range from greater than about 5 Kbar to about 80 kbar, and the temperature for step S7 of the gallium nitride crystal growth process is in a range between about 550° C. to about 3000° C.

The HPHT system is then allowed to cool in step S8 and the high pressure is relieved in step S9. The gallium nitride crystals are removed from the HPHT system and pressure cell in step S10, for example by being washed in water and mineral acids. The mineral acids for washing the gallium nitride crystals include, but are not limited to, hydrochloric acid (HCl) and nitric acid ($HNO_3$).

The mineralizers, as embodied by the invention, comprise at least one of alkali and alkaline-earth nitrides, such as at least one of $Li_3N$, $Mg_3N_2$, and $Ca_3Na_2$; amides, such as, but not limited to, $LiNH_2$, $NaNH_2$, and $KNH_2$; urea and related compounds; ammonium salts, such as, but not limited to, $NH_4F$ and $NH_4Cl$; halide, sulfide, and nitrate salts, such as, but not limited to, NaCl, $Li_2S$, and $KNO_3$; lithium (Li) salts; and combinations thereof. The mineralizers may be provided as solids or as additives dissolved in fluids, such as solvents.

The filling and sealing steps, steps S5 and S6 respectively, will now be described. The capsule is filled with a nitrogen-containing solvent, for example at least one of ammonia or hydrazine or an organic solvent, including, but not limited to, methylamine, melamine, or ethylenediamine, without admitting air or water, which are undesirable in the gallium nitride formation process. To fill the capsule in step S5, without admitting air or water, the capsule is filled and connected to a negative pressure source, such as a vacuum manifold, and evacuated. The capsule is then chilled to a temperature below room temperature (about 72° F.) and vapor-phase solvent can be admitted to the manifold. The vapor-phase solvent then condenses in the capsule. For example, if the nitrogen-containing solvent comprises ammonia, the condensation can be performed at dry ice or liquid-nitrogen temperatures.

The capsule can then be isolated so as to seal the capsule in step S6 by closing a valve to the negative pressure source. The capsule can then be separated from at least one of the manifold or the valve by a pinching-off step using a cold-welding apparatus, which is well known in the art. The pinching-off step is particularly effective if the capsule is copper. The integrity of the seal may be enhanced by optional arc-welding.

The capsule and pressure cell comprise any appropriate form that permit the gallium nitride growth process to withstand the high pressures and high temperatures, as embodied by the invention. The HPHT system that applies the high pressures and high temperatures can comprise a press device, which can include at least one of a die and punch. For example, and in no way limiting of the invention, the press device comprises one of a piston-cylinder press; a belt press; a tetrahedral-, cubic-, or octahedral-anvil press; a recessed-anvil press; and a toriod-type press, each of which are known to those of skill in the art.

Figure 2:
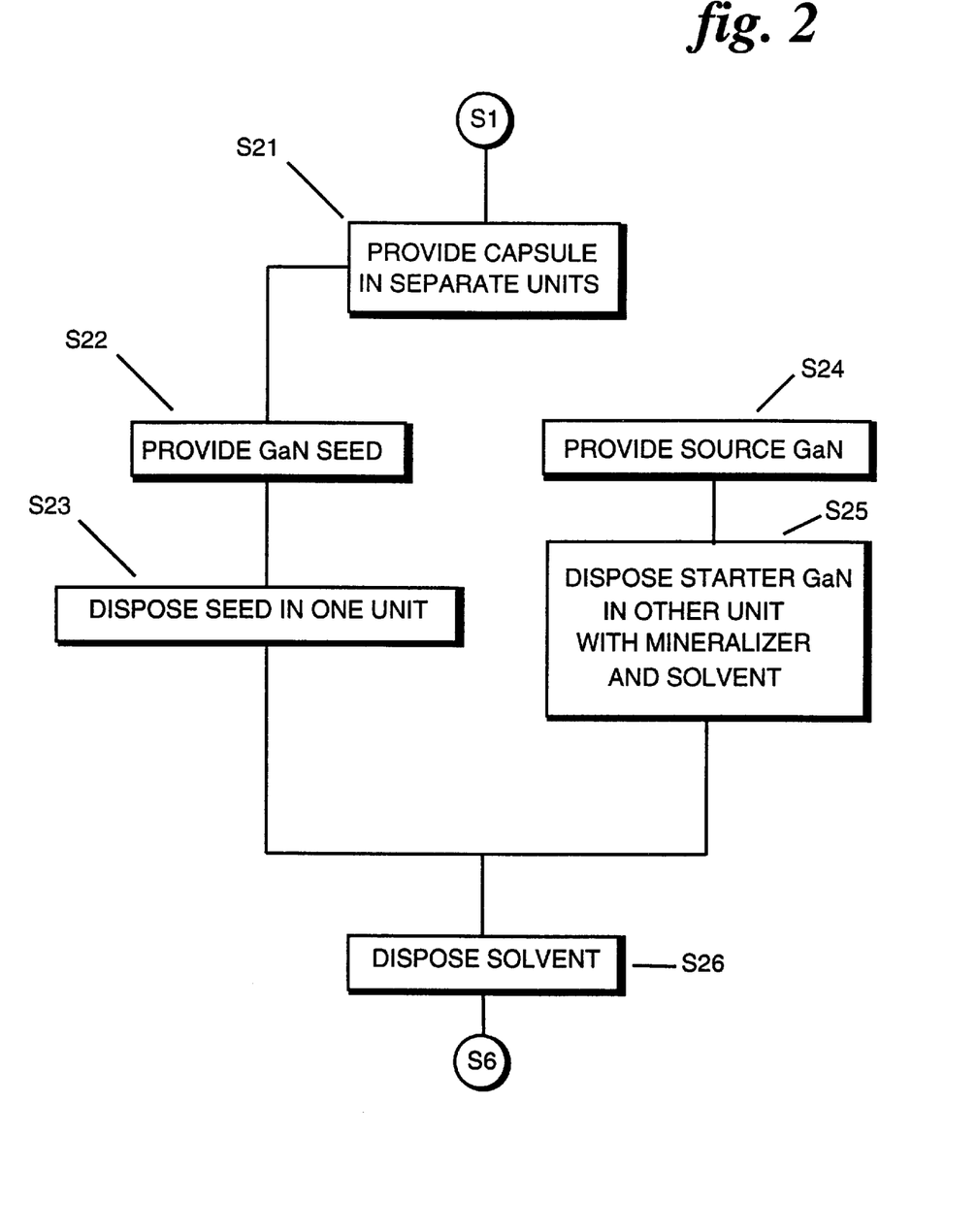
FIG. 2 is a flowchart illustrating another gallium nitride growth process, as embodied by the invention.

A further gallium nitride crystal growth process, as embodied by the invention, will be discussed with respect to FIG. 2. A capsule is provided in step S21. The capsule comprises two opposed end units that are separated by a baffle with one or more apertures. A gallium nitride crystal seed is provided in step S22, and disposed in one end unit of the capsule in step S23. Source gallium nitride is provided together with mineralizer and solvent in step S24, and is disposed in the other end unit of a capsule in step S25. Solvent, as embodied by the invention, is disposed in each of the capsule end units in step S26. The gallium nitride growth process then continues with step S6, as illustrated in FIG. 1.

The gallium nitride seed may comprise a gallium nitride crystal. Alternatively, the gallium nitride seed may comprise a gallium nitride crystal that includes a thin film of a suitable protective material, such as platinum, on the gallium nitride seed. The thin protective film prevents dissolution of the gallium nitride seed prior to gallium nitride crystal growth under the elevated pressure and elevated temperatures, as embodied by the invention. The gallium nitride, which is used in the gallium nitride growth process of FIG. 1, may also comprise gallium nitride crystals as the starting gallium nitride in step S1.

Another gallium nitride growth process, as embodied by the invention, comprises spontaneous gallium nitride crystal nucleation from source gallium nitride, such as gallium nitride powder. This spontaneous gallium nitride crystal nucleation process produces gallium nitride nuclei upon which further gallium nitride crystal growth will occur. The source gallium nitride powder is provided at a "hot end unit" of the pressure cell, which is the end unit of the pressure cell that is disposed to the heat source in the HPHT system. At elevated-pressures and elevated-temperatures, as embodied by the invention, the temperature differential between the cold and hot end units of the pressure cell is in a range from about 5° C. to about 300° C. Thus, the source gallium nitride powder is dissolved and recrystallized under the HPHT conditions thus forming spontaneous gallium nitride crystals.

Figure 3:
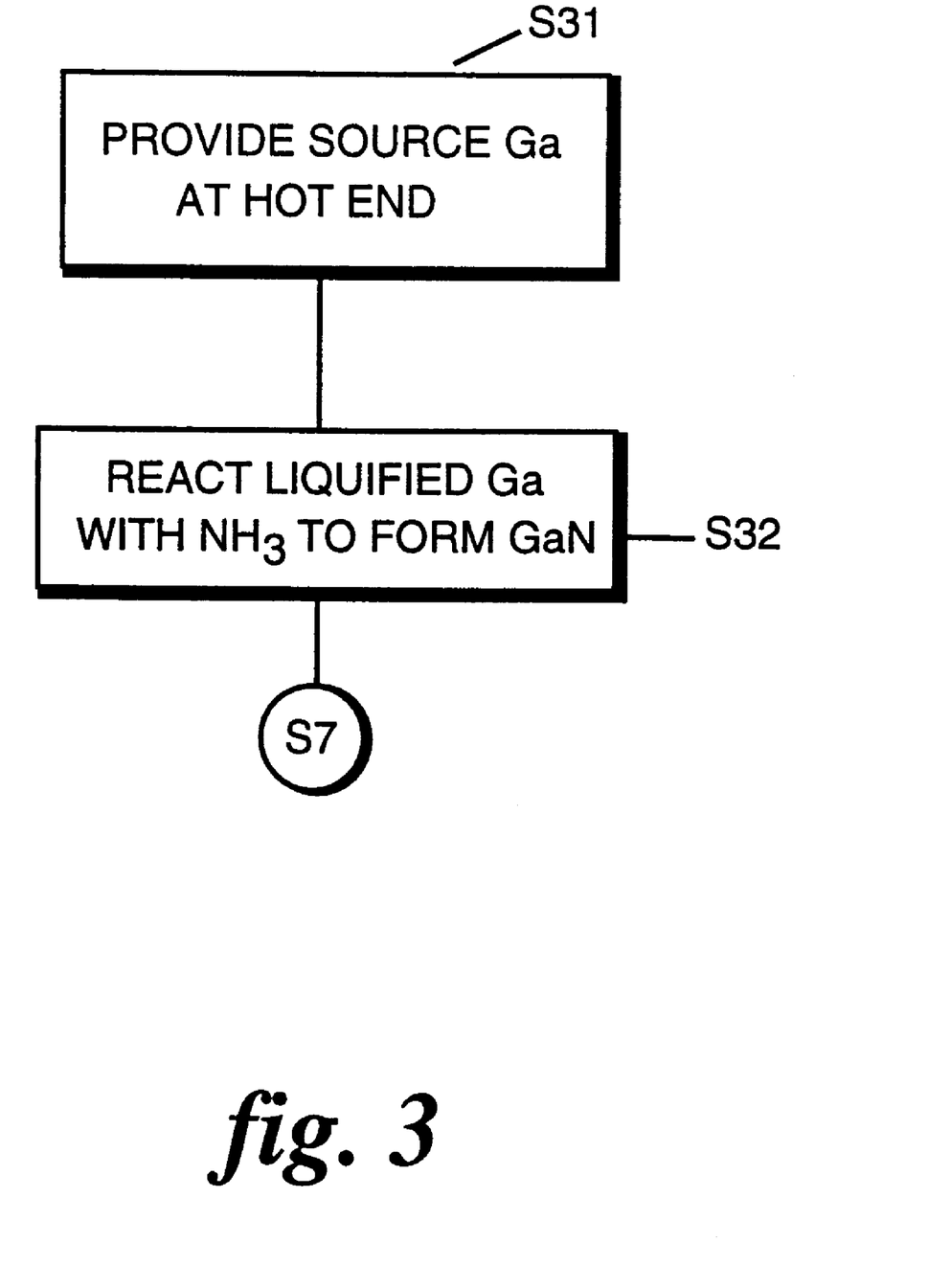
FIG. 3 is a flowchart illustrating another gallium nitride growth process, as embodied by the invention.

The gallium nitride growth process, as embodied by the invention, may also use solid or liquefied gallium, as a source material, in a hot end of the pressure cell. The source gallium reacts with the nitrogen-containing solvent under the HPHT growth conditions, as embodied by the invention, to form gallium nitride. This alternative gallium nitride growth process, as embodied by the invention, will be described with reference to FIG. 3. In FIG. 3, step S31 comprises of providing gallium at a hot unit of a pressure cell. Next, in step S32, the gallium reacts with ammonia ($NH_3$) to form gallium nitride (GaN). The process, as embodied by FIG. 3, then proceeds to the HPHT conditions as in step S7.

Figure 4:
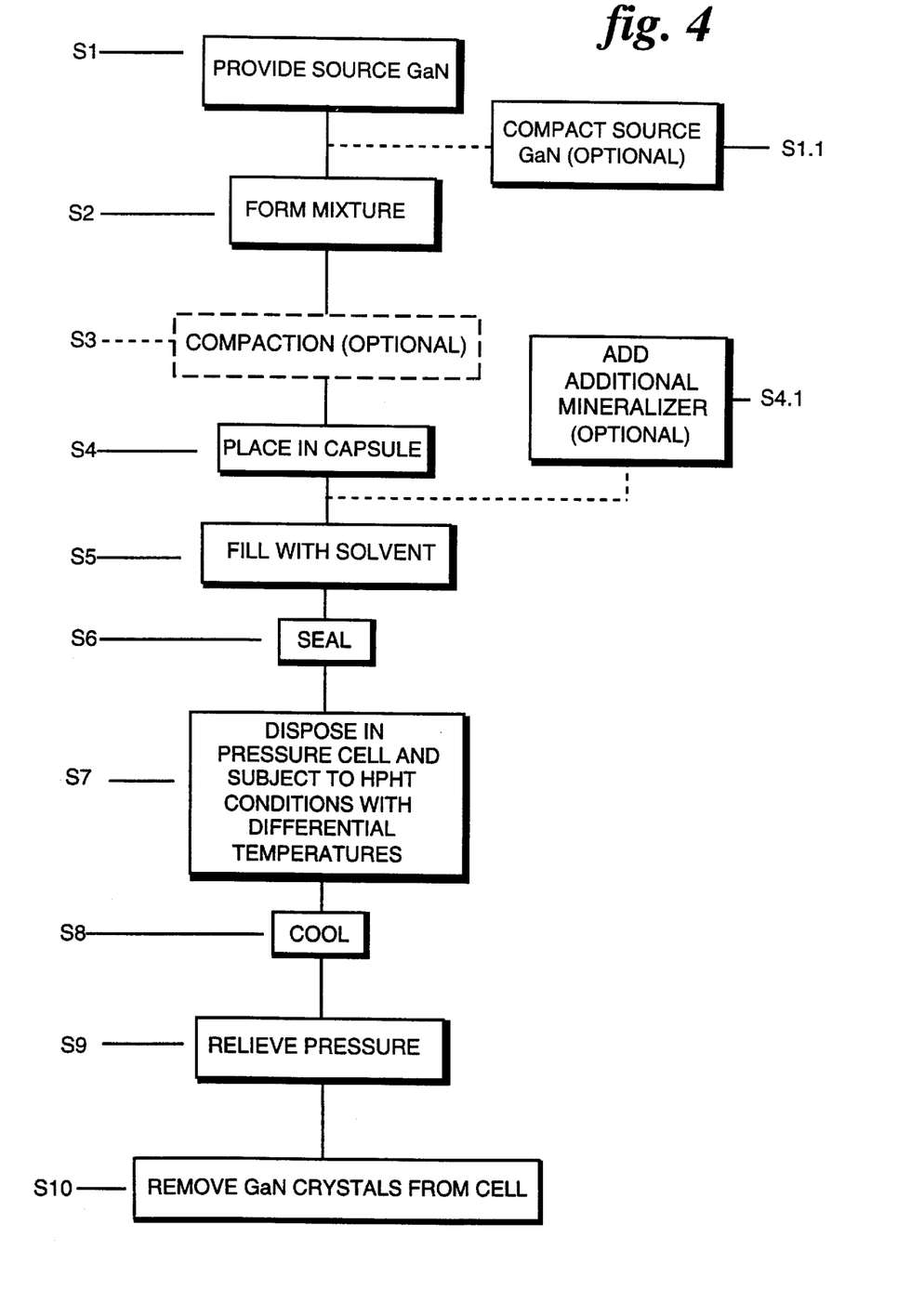
FIG. 4 is a flowchart illustrating another gallium nitride growth a process, as embodied by the invention.

Another alternate gallium nitride growth process, as embodied by the invention, comprises creating a temperature differential within the pressure cell, in which this process uses a two-zone capsule. The temperature differential may be created by providing a greater degree of heat to one end unit of the capsule compared to the other end unit of the capsule in step S7. This alternate gallium nitride growth process is depicted in the flowchart of FIG. 4. The steps illustrated in FIG. 4 are similar to those in FIG. 1, and the differences between these processes will be explained hereinafter. In the growth process of FIG. 4, the heat source is differentially applied with respect to the pressure cell, as in step S7.1 during the application of the HPHT conditions. This application changes the temperatures applied to the pressure cell and creates differential temperatures therein. End units of the pressure cell can be held at one temperature, for example ambient temperature, while a central portion of the pressure cell, is heated to an appropriate HPHT temperature. Operation of the gallium nitride growth process conducted with different heat zones, for example those that would define temperature differentials within the pressure cell, provide for varying gallium nitride growth rates.

The differential heating during the HPHT conditions, as embodied by the invention, include, but are not limited to, steps of: asymmetric placement of gallium nitride source in the pressure cell within a lower temperature end of the pressure cell; using an auxiliary heater to heat the source gallium nitride in the higher temperature end unit of the pressure cell; and using a heating source that generates differential heat at the gallium nitride source end unit of the pressure cell. Another differential heating during the HPHT conditions step comprises providing the gallium nitride source end unit of the pressure cell with a thinner heater element, so this portion of the pressure cell heats up its contents more readily to create the temperature differential.

Figure 5:
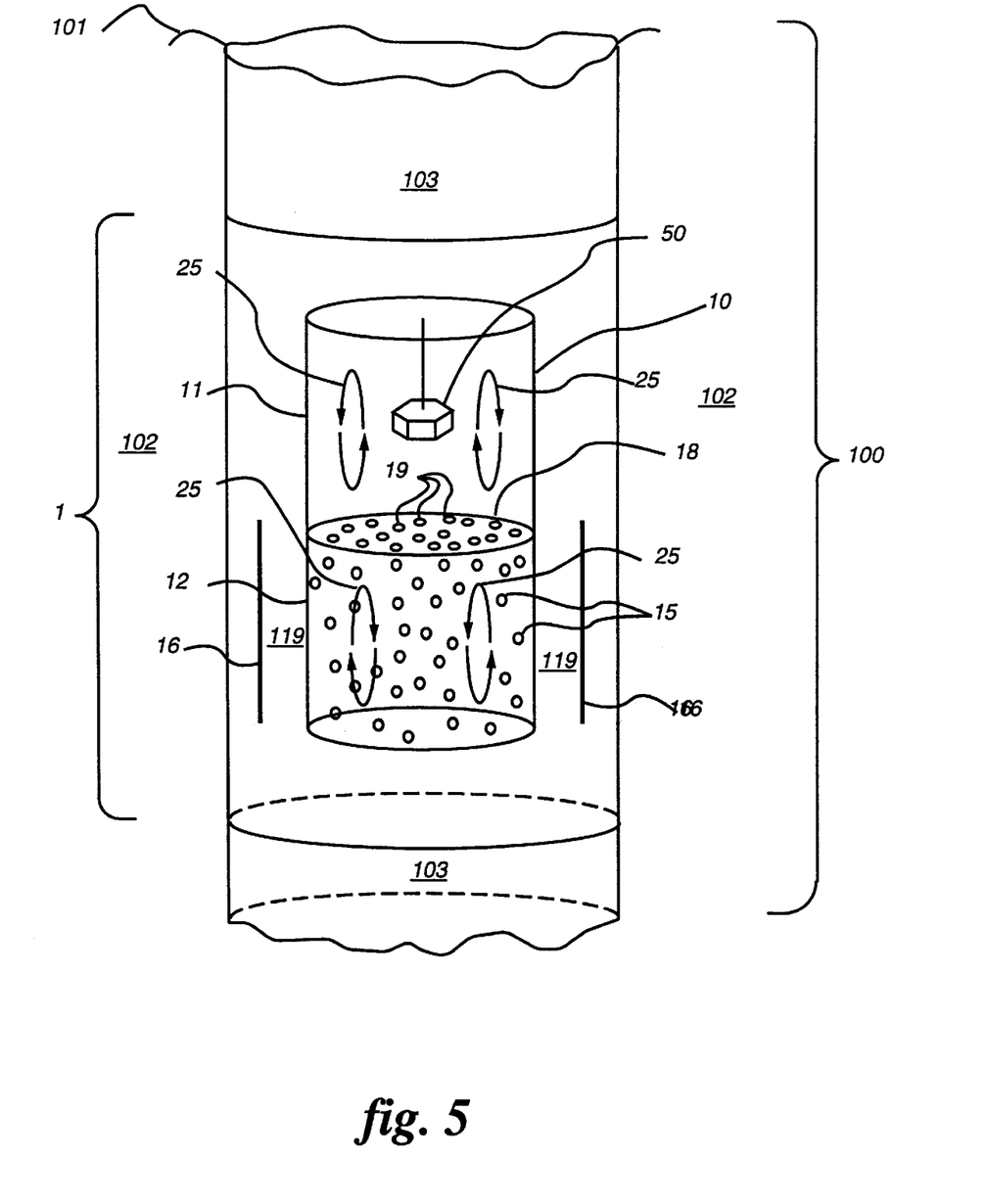
FIG. 5 is a part-sectional schematic illustration of a high pressure high temperature pressure cell for gallium nitride growth processes, as embodied by the invention.
Figure 6:
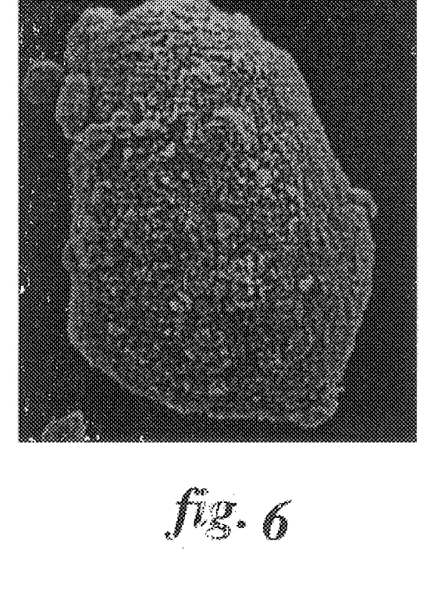
FIG. 6 is a scanning electron micrograph of untreated, source gallium nitride powder.
Figure 7:
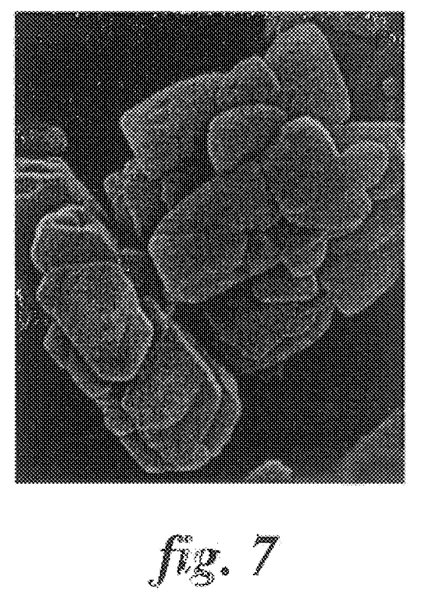
FIG. 7 is a scanning electron micrograph of treated gallium nitride having hexagonal features, which are characteristic of a hexagonal (wurtzite) crystalline lattice structure, which has been grown under a gallium nitride growth process, as embodied by the invention.

An exemplary pressure cell 1, as embodied by the invention, is illustrated in FIG. 5. The capsule 10 is illustrated disposed in a HPHT system 100. The capsule 10 comprises two mating end units, 11 and 12, respectively. Sealing gasket materials (not illustrated for ease of illustration) are disposed at one or more end units to prevent leakage from the capsule 10 under HPHT conditions in the HPHT system 100. In FIG. 5, a source gallium nitride 15 is disposed in the end unit 12. The end unit 12 is disposed proximate a heat source 16, schematically illustrated in FIG. 5.

The heat source 16 may include a graphite tube. The heat source 16 is placed in the pressure cell 1 so as to be in thermal communication with the capsule's contents, and pressure medium 119 may be disposed therebetween. The capsule 10 is placed in a press device 101 of the HPHT system 100. The press device includes a die 102 that surrounds the periphery of the pressure cell, and opposed punches 103 that surround the end units, 11 and 12, of the pressure cell. Each of the die 102 and the opposed punches 103 apply pressure to the pressure cell during the gallium nitride growth process, in amounts sufficient to form gallium nitride crystals, as embodied by the invention.

The end unit 12 comprises solvent and mineralizer 17 that are filled therein. The capsule 10 further includes a baffle structure 18 that is disposed between the end units, 11 and 12. The baffle structure 18 acts as a partial barrier and impedes free convection between the end units, 11 and 12. The baffle structure 18 includes at least one and possibly a plurality of apertures 19, and can be formed of a mesh, as long as it impedes free convection between the end units. Convection in each of the end units, 11 and 12, is free and stirs the reaction under the HPHT conditions, so as to result in an enhanced gallium nitride crystal growth rate, gallium nitride crystal uniformity, and gallium nitride crystal homogeneity.

Further, the end unit 11 is illustrated as containing a gallium nitride crystal 50. The crystal 50 is representative of a gallium nitride seed upon which further gallium nitride growth is achieved, or can be representative of a formed gallium nitride crystal that is being formed under the HPHT conditions, as embodied by the invention. Arrows 25 illustrate flow patterns that are believed to be formed in the end units, 11 and 12, of the pressure cell 10 under HPHT conditions.

The capsule 10 is generally formed of copper or a copper capsule with an inert-metal liner, since copper does not readily corrode or become embrittled by the HPHT reaction conditions, and also exhibits desirable cold-welding properties. Further, copper is a desirable material for the capsule 10 because it exhibits low permeability for hydrogen, which would have a deleterious effect on the HPHT apparatus if it leaked from the capsule. Alternatively, the capsule 10 may also be formed of platinum, since platinum will exhibit similar benefits as those discussed above with respect to copper.

The gallium nitride growth process, as embodied by the invention, will now be further described with reference to examples. These examples are not intended to limit the invention in any way. The dimensions, amounts, volumes, weights, and measured variables are provided in approximate units.

EXAMPLE I

A copper capsule having with an internal volume of about 0.04 $cm^3$, is filled with approximately 0.017 grams (g) of poorly-crystallized source gallium nitride powder, about 0.012 g of $Li_3N$ (mineralizer), and about 0.022 g of condensed ammonia (solvent). The capsule is then sealed, for example by cold welding. The sealed capsule is then placed within a pressure cell of a piston press assembly in a HPHT system. The pressure cell includes at least one of sodium chloride (NaCl) and magnesium oxide (MgO) pressure medium. A graphite indirect-heating tube is included in the pressure cell of the HPHT system. The pressure cell is then treated at an elevated temperature of about 800° C. and an elevated pressure of about 25 kbar for about 1 hour.

At the completion of the elevated temperature and elevated pressure conditions, the pressure cell is cooled, and the pressure within the pressure cell is lowered. The contents of the pressure cell are recovered and washed, as discussed above. The final gallium nitride product comprises a fine white gallium nitride powder. Scanning electron micrographs of the gallium nitride powder before and after the gallium nitride growth process, as embodied by the invention, are provided in FIGS. 4 and 5. FIG. 4 illustrates untreated gallium nitride powder. FIG. 5 illustrates gallium nitride having hexagonal features, which are characteristic of a hexagonal (wurtzite) crystalline lattice structure, in which the gallium nitride has been grown under a gallium nitride growth process, as embodied by the invention.

EXAMPLE II

A second exemplary of the gallium nitride growth process, as embodied by the invention, uses a pressure cell and provides a temperature gradient to the pressure cell and its contents to grow gallium nitride crystals. In this process, a platinum capsule having an internal volume of about 0.06 $cm^3$ is loaded with a reactant pill in a unit of the capsule. The reactant pill comprises approximately 0.017 g of poorly-crystallized gallium nitride powder, about 0.012 g of $Li_3N$, and about 0.001 g of $NH_4Cl$.

A partial barrier, or baffle, is disposed inside the capsule to be positioned on the pill. The baffle impedes free convection between the hot and cold ends of the capsule, when the pressure cell is heated, as embodied by the invention. Approximately 0.032 g of ammonia is condensed into the capsule. The capsule is then sealed a small distance above the baffle.

The capsule is disposed within a pressure cell, which includes NaCl and MgO pressure medium and a graphite indirect-heating tube. The pressure cell is disposed in a piston press assembly in a HPHT system. A temperature gradient is established in the pressure cell by positioning the capsule near the upper end of the pressure cell. This capsule position causes the upper end of the capsule to remain cooler than the lower end. The ends of the pressure cell are held at room temperature while a center portion of the pressure cell is heated by the graphite indirect-heating tube to a HPHT temperature.

Operation of the gallium nitride growth process under HPHT conditions with different hot zone temperatures provides different gallium nitride growth rates and growth results. For example, operation of a pressure cell containing poorly-crystallized gallium nitride powder, Li$_3$N, NH$_4$Cl, and ammonia under HPHT conditions with a temperature of about 800° C. for about 1 hour yields large white gallium nitride polycrystalline masses both above and below the baffle. An operation of a similar pressure cell under HPHT conditions at about 600° C. for about 1 hour, results in the top end unit of the pressure cell containing large white gallium nitride polycrystalline masses, and gallium nitride powder that resembles the starting gallium nitride, as discussed above, in the other end unit.

While various embodiments are described herein, it will be appreciated from the specification that various combinations of elements, variations or improvements therein may be made by those skilled in the art, and are within the scope of the invention.

What is claimed is:

1. A gallium nitride growth process for forming crystalline gallium nitride, the process comprising:
    providing a source gallium nitride, the source gallium nitride comprising gallium nitride:
    providing a mineralizer:
    providing a solvent;
    providing a capsule comprising a first end unit and a second end unit, said first end unit and said second end unit being opposed to each other;
    disposing the source gallium nitride, mineralizer and solvent in the capsule in said first unit of the capsule;
    sealing said first unit of the capsule to said second unit;
    disposing the capsule in a pressure cell; and
    subjecting the pressure cell to (HPHT) conditions, wherein said first end of the capsule is subjected to a pressure of greater than 5 Kbar and a temperature of greater than 550° C., wherein a temperature differential between said first end and said second end of the capsule is established, and wherein the temperature differential between said first and second ends is between about 5° C. and about 300° C., for a length of time sufficient to dissolve the source gallium nitride and precipitate the source gallium nitride onto at least one gallium nitride crystal.

2. The process according to claim 1, wherein the step of subjecting the pressure cell to high pressure and high temperature (HPHT) conditions comprises disposing the pressure cell in a high pressure and high temperature (HPHT) system.

3. The process according to claim 2, the method further comprising the steps of:
    cooling the high pressure and high temperature (HPHT) system;
    relieving the pressure in the high pressure and high temperature (HPHT) system; and
    removing the gallium nitride crystals from the high pressure and high temperature (HPHT) system.

4. The process according to claim 3, wherein the step of removing the gallium nitride crystals from the high pressure and high temperature (HPHT) system comprises:
    washing the gallium nitride crystals in at least one of water and mineral acids.

5. The process according to claim 4, wherein the mineral acids are selected from hydrochloric acid (HCl) or nitric acid (HNO$_3$).

6. The process according to claim 1, further comprising the step of:
    forming a mixture comprising the source gallium nitride and at least one of the mineralizer and solvent, and then disposing the mixture in the capsule.

7. The process according to claim 6, further comprising the step of compacting the mixture.

8. The process according to claim 1, wherein the at least one gallium nitride crystal comprises at least one of gallium nitride crystal or gallium nitride boule.

9. The process according to claim 8, wherein the diameter of the gallium nitride crystal or gallium nitride boule is in a range from about 1 inch to about 6 inches.

10. The process according to claim 8, wherein the thickness of the at least one of gallium nitride crystal or gallium nitride boule is in a range from about 0.02 inches to about 12 inches.

11. The process according to claim 1, wherein the solvent comprises one of a nitrogen-containing solvent or an organic solvent.

12. The process according to claim 11, wherein the nitrogen-containing solvent comprises at least one of ammonia (NH$_3$) or hydrazine, and the organic solvent is selected from methylamine, melamine, or ethylenediamine.

13. The process according to claim 1, wherein the step of subjecting the pressure call to high pressure and high temperature (HPHT) conditions for a length of time sufficient to dissolve the source gallium nitride and precipitate the source gallium nitride into at least one gallium nitride crystal comprises:
    subjecting the pressure cell to pressures greater than 5kbar and up to about 80 kbar.

14. The process according to claim 1, wherein the step of subjecting the pressure cell to high pressure and high temperature (HPHT) conditions for a length of time sufficient to dissolve the source gallium nitride and precipitate the source gallium nitride into at least one gallium nitride crystal comprises:
    subjecting the pressure cell to a temperature in a range of greater than 550° C. and less than about 3000° C.

15. The process according to claim 1, wherein the mineralizer comprises at least one of alkali and alkaline-earth nitrides; amides; urea; ammonium salts; at least one of halide salts, sulfide salts, lithium salts, and nitrate salts; and combinations thereof, wherein the alkali and alkaline-earth nitrides are selected from Li$_3$N, Mg$_3$N$_2$, or Ca$_3$Na$_2$; the amides are selected from LiNH$_2$, NaNH$_2$, or KNH$_2$; the ammonium salts are selected from NH$_4$F and NH$_4$Cl; and at least one of halide salts, sulfide salts, lithium salts, and nitrate salts are selected from NaCl, Li$_2$S, and KNO$_3$.

16. The process according to claim 1, wherein the mineralizers comprise additives dissolved in solvents.

17. The process according to claim 1, wherein the step of providing a source gallium nitride comprises a crystalline gallium nitride.

18. The process according to claim 17, wherein the step of providing a source gallium nitride comprises providing a gallium nitride crystal seed comprising a protective film that prevent dissolution of the gallium nitride prior to the step of subjecting the pressure cell to high pressure and high temperature (HPHT) conditions for a length of time sufficient to dissolve the source gallium nitride and precipitate the source gallium nitride into gallium nitride crystals.

19. The process according to claim 1, wherein the temperature differential is established within the pressure cell by disposing a heat source and the pressure cell proximate to one another.

20. The process according to claim 1, wherein the temperature differential is established within the pressure cell by one of: asymmetrically disposing the source gallium nitride in the pressure cell at a higher temperature end of the pressure cell; providing an auxiliary heater to heat one end of the pressure cell; and providing a heating source that generates differential heat to the source gallium nitride in the pressure cell.

21. The process according to claim 1, wherein the temperature differential is established within the pressure cell by providing a heater for the pressure cell proximate to the source gallium nitride in the pressure cell with a thinner heater element, whereby the thinner heater element generates more heat inside the pressure cell and heats up the source gallium nitride to create the temperature differential.

22. The process according to claim 1, wherein the step of providing a capsule comprises:
providing a capsule that comprises two mating end units, one of the end units being adapted to be disposed close to a heat source, and a baffle structure disposed between the end units.

23. The process according to claim 1, wherein the step of subjecting the pressure cell to high pressure and high temperature (HPHT) conditions for a length of time sufficient to dissolve the source gallium nitride and precipitate the source gallium nitride into at least one gallium nitride crystal comprises disposing the pressure cell in a press device that applies the high pressure conditions.

24. The process according to claim 23, wherein the step of disposing the pressure cell in a press device comprises disposing the pressure cell in a press device that comprises at least one of a die and punch that apply the high pressure.

25. The process according to claim 1, further comprising the steps of:
compacting at least one of the source gallium nitride, a mixture comprising gallium nitride and solvent, gallium nitride and mineralizer, or a mixture comprising gallium nitride and solvent and mineralizer;
cooling the high pressure and high temperature (HPHT) system;
relieving the pressure in the high pressure and high temperature (HPHT);
removing the gallium nitride crystals from the high pressure and high temperature (HPHT) system; and
washing the gallium nitride crystals in at least one of water and mineral acids.

26. The process of claim 1, wherein the capsule comprises one of a copper capsule or a copper capsule with an inert-metal liner, and the step of disposing the source gallium nitride, mineralizer and solvent in the capsule comprises;
connecting the capsule to a negative pressure manifold;
evacuating the capsule;
chilling the capsule to a temperature below room temperature;
admitting vapor-phase solvent to the manifold;
condensing the vapor-phase solvent in the capsule.

27. The process according to claim 26, wherein the step of sealing the capsule comprises:
closing off the capsule by at least one of pinching-off a section of the capsule to seal the capsule and closing a valve to the negative pressure manifold.

28. A gallium nitride growth process for forming crystalline gallium nitride, the process comprising:
providing a source gallium nitride, the source gallium nitride comprising gallium nitride;
providing a mineralizer;
providing a solvent;
providing a capsule comprising a first end unit and a second end unit, said first end unit and said second end unit being opposed to each other;
combining the source gallium nitride with at least one of a mineralizer and
a solvent to form a mixture;
compacting the mixture;
disposing the mixture in said first unit of the capsule;
disposing at least one of the mineralizer and the solvent to said first unit of the capsule so the mixture in the capsule comprises source gallium nitride, mineralizer, and solvent;
sealing said first unit of the capsule to said second unit;
disposing the capsule in a pressure cell; and
subjecting the pressure cell to (HPHT) conditions, wherein said first end of the capsule is subjected to a pressure of greater than 5 kbar and a temperature of greater than 550° C., wherein a temperature differential between said first end and said second end of the capsule is established, and wherein the temperature differential between said first end and said second end is between about 5° C. and about 300° C., for a length of time sufficient to dissolve the source gallium nitride and precipitate the source gallium nitride into at least one gallium nitride crystal;
cooling the high pressure and high temperature (HPHT) system;
relieving the pressure in the high pressure and high temperature (HPHT);
removing the gallium nitride crystals from the high pressure and high temperature (HPHT) system; and
washing the gallium nitride crystals in at least one of water and mineral acids.

29. A gallium nitride growth process for forming crystalline gallium nitride, the process comprising:
providing a capsule that comprises two opposed end units;
disposing source gallium nitride crystal seed in one end unit of the capsule;
disposing source gallium nitride with at least one of a mineralizer and a solvent in the other end unit of the capsule, the source gallium nitride comprising gallium nitride;
disposing solvent in each of the capsule end units;
subjecting the pressure cell to (HPHT) conditions, wherein said first end of the capsule is subjected to a pressure of greater than 5 kbar and a temperature of greater than 550° C., wherein a temperature differential between said first end and said second end of the capsule is established, and wherein the temperature differential between said first end and said second end is between about 5° C. and about 300° C., for a length of time sufficient to dissolve the source gallium nitride and precipitate the source gallium nitride onto at least one gallium nitride crystal.

30. The process according to claim 29, the process further comprising the steps of cooling the high pressure and high temperature (HPHT) system;
relieving the pressure in the high pressure and high temperature (HPHT);
removing the gallium nitride crystals from the high pressure and high temperature (HPHT) system; and washing the gallium nitride crystals in at least one of water and mineral acids.

31. A gallium nitride growth process for forming crystalline gallium nitride, the process comprising:

provi­ding source gallium, wherein the source gallium comprises at least one of liquid or solid gallium;

providing a capsule that comprises first and second opposed end units;

disposing the source gallium in said first unit of the capsule;

disposing the source gallium with at least one of a mineralizer and a solvent to form a mixture, wherein the mineralizer and the solvent are disposed with the source gallium nitride by one of;

disposing the mineralizer and solvent individually to the source gallium nitride; or disposing the solvent and mineralizer separately to the source gallium nitride;

subjecting said first end of the capsule to a pressure of greater than 5 kbar and less than about 80 kbar and a temperature of greater than 550° C. and less than about 3000° C., the temperature differential between said first and second ends being from about 5° C. to about 300° C., for a length of time sufficient to react the liquefied gallium with the ammonia under the HPHT growth conditions to form gallium nitride; and subjecting the capsule to high pressure and high temperature (HPHT) conditions for a length of time sufficient to dissolve the formed gallium nitride and precipitate the source gallium nitride into at least one gallium nitride crystal.

32. The process according to claim 31, further comprising the steps of cooling the high pressure and high temperature (HPHT) system;

relieving the pressure in the high pressure and high temperature (HPHT);

removing the gallium nitride crystals from the high pressure and high temperature (HPHT) system; and washing the gallium nitride crystals in at least one of water and mineral acids.

33. A gallium nitride growth process for forming crystalline gallium nitride, the process comprising:

providing a source gallium nitride, the source gallium nitride comprising gallium nitride;
providing a mineralizer;
providing a solvent;

providing a capsule comprising a first end unit and a second end unit, said first end unit and said second end unit being opposed to each other;

combining the source gallium nitride with at least one of a mineralizer and a solvent to form a mixture;

disposing the mixture in said first unit of the capsule;

disposing at least one of the mineralizer and the solvent in said first unit of the capsule so the mixture in the capsule comprises source gallium nitride, mineralizer, and solvent;

sealing said first unit of the capsule to said second unit;

disposing the capsule in a pressure cell; and subjecting the pressure cell to (HPHT) conditions, wherein said first end of the capsule is subjected to a pressure of greater than 5 kbar and a temperature of greater than 550° C., wherein a temperature differential between said first end and said second end of the capsule is established, and wherein the temperature differential between said first and second ends is between about 5° C. and about 300° C., for a length of time sufficient to dissolve the source gallium nitride and precipitate the source gallium nitride into at least one gallium nitride crystal;

cooling the high pressure and high temperature (HPHT) system;

relieving the pressure in the high pressure and high temperature (HPHT);

removing the gallium nitride crystals from the high pressure and high temperature (HPHT) system; and washing the gallium nitride crystals in at least one of water and mineral acids.

34. The process according to claim 13, wherein the step of subjecting the pressure cell to pressures greater than 5 kbar and up to about 80 kbar comprises subjecting the pressure cell to pressures greater than about 25 kbar and up to about 80 kbar.

35. The process according to claim 14, wherein the step of subjecting the pressure cell to a temperature in a range of greater than 550° C. and less than about 3000° C. comprises subjecting the pressure cell to a temperature in a range of between about 600° C. and about 3000° C.

36. The process according to claim 35, wherein the step of subjecting the pressure cell to a temperature in a range of between about 600° C. and about 3000° C. comprises subjecting the pressure cell to a temperature in a range of between about 800° C. and about 3000° C.

* * * * *